United States Patent
Schroeder (10) Patent No.: US 9,590,943 B2
(45) Date of Patent: Mar. 7, 2017

(54) OFFLINE PROMPTS OF ONLINE SOCIAL NETWORK MENTIONS

(71) Applicant: salesforce.com, inc., San Francisco, CA (US)

(72) Inventor: Jason Schroeder, Los Angeles, CA (US)

(73) Assignee: salesforce.com, inc., San Francisco, CA (US)

(*) Notice: Subject to any disclaimer, the term of this patent is extended or adjusted under 35 U.S.C. 154(b) by 306 days.

(21) Appl. No.: 14/522,193

(22) Filed: Oct. 23, 2014

(65) Prior Publication Data

US 2015/0120835 A1 Apr. 30, 2015

Related U.S. Application Data

(60) Provisional application No. 61/895,649, filed on Oct. 25, 2013.

(51) Int. Cl.
*H04L 12/58* (2006.01)

(52) U.S. Cl.
CPC .............. *H04L 51/32* (2013.01); *H04L 51/16* (2013.01)

(58) Field of Classification Search
CPC ........ G06F 17/30864; G06F 8/41; G06F 8/43; G06Q 50/01
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

OTHER PUBLICATIONS

Saba, "Saba Announces Revolutionary Social Enterprise Platform," Press Release, Mar. 20, 2012, pp. 1-4, Redwood Shores, California.

(Continued)

*Primary Examiner* — Peling Shaw
(74) *Attorney, Agent, or Firm* — Dergosits & Noah LLP; Todd A. Noah (57) ABSTRACT

A system, method and apparatus for creating scripts to provide offline prompts in a social networking application operating on a client device are provided. History data for a user of the social networking application is received at a server. A script is created by the server based on the history data for the at least one user. The script, when executed by a client device remote from the server and operated by the user, provides a prioritized list of user identifiers on the social networking application. The script is sent by the server to the client device.

20 Claims, 5 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0216300 A1* | 9/2005 | Appelman ............ G06Q 10/10 705/319 |
| 2008/0249972 A1 | 10/2008 | Dillon |
| 2009/0100342 A1 | 4/2009 | Jakobson |
| 2010/0268830 A1* | 10/2010 | McKee ................. G06Q 50/01 709/228 |
| 2011/0099263 A1* | 4/2011 | Patil ..................... G06Q 50/01 709/224 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0262588 A1* | 10/2013 | Barak .................... H04L 67/22 709/204 |
| 2016/0088091 A1* | 3/2016 | Cushing ................ H04L 67/14 709/227 |

OTHER PUBLICATIONS

U.S. Appl. No. 13/998,890.
U.S. Appl. No. 13/987,075.
U.S. Appl. No. 13/987,074.

(56) References Cited

OTHER PUBLICATIONS

U.S. Appl. No. 13/998,065.
U.S. Appl. No. 13/986,744.
U.S. Appl. No. 13/986,251.

* cited by examiner

OFFLINE PROMPTS OF ONLINE SOCIAL NETWORK MENTIONS

CLAIM OF PRIORITY

This application claims the benefit of U.S. Provisional Patent Application 61/895,649 entitled SYSTEM AND METHOD FOR OFFLINE PROMPTS OF ONLINE SOCIAL NETWORK MENTIONS, by Jason Schroeder, filed Oct. 25, 2013, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to online social networking and messaging systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Social networking has become a progressively more popular form of communication over the years. Users are able to broadcast messages to a wide audience, as well as direct specific messages to a targeted individual or group of individuals across the many different social networking platforms. Within the many social networking platforms, the use of mentions has become more prevalent. A mention is an online social network update that contains a user identifier anywhere in the body of the update. For example, if Ann, a Twitter® account user, tweets a message that she is "looking forward to a meeting with @Bob and @Chris," the users corresponding to the @Bob and @Chris user identifiers are notified of the tweet via the mentions tab for their respective Twitter® accounts. During the composition of these types of messages, an auto-complete application may be used to prompt a user to select from an auto-populated list of user identifiers that correspond to the already-entered characters.

The auto-complete application helps facilitate the process of entering a mention by not requiring the user to enter the full user identifier. The auto-populated list may include recently entered user identifiers, or all user identifiers from a contacts list, that match the characters already entered. Most auto-complete applications executing on a client side user system submit requests to retrieve lists of user identifiers from the server, and do so for each character that the user inputs. For example, if a user types the five characters for "steve," the auto-complete application executing on the client side user system makes five separate network requests to the server—the first for a list corresponding to "s", the second for "st", the third for "ste", and so on. Network requests can be slow, especially on mobile devices. Some auto-complete applications use an optimization process where they query the server after an idle delay. For example, if a user types "stev" and then pauses, the network request would be made only after the pause, e.g., 800 milliseconds. Accordingly, it is desirable to provide a technique that provides offline prompts of user identifiers for auto-completing mentions in a social networking application.

BRIEF SUMMARY

A system, method and apparatus for creating scripts to provide offline prompts in a social networking application operating on a client device are provided. History data for a user of the social networking application is received at a server. A script is created by the server based on the history data for the at least one user. The script, when executed by a client device remote from the server and operated by the user, provides a prioritized list of user identifiers on the social networking application. The script is sent by the server to the client device.

In some implementations, the history data for the user of the social networking application includes at least one of previous mentions of users and previous mentions of topics in posts of the social networking application. In some instances, the previous mentions of topics is determined based on keywords extracted from the text in the posts. In other instances, the previous mentions of users may be indicated by user identifiers corresponding to the mentioned users. The user identifiers may be identified as characters immediately following a first metadata tag, such as an "@" symbol. The previous mentions of topics may be indicated by characters immediately following a second metadata tag, such as a "#" symbol.

In various implementations, the created script, when executed, provides the prioritized list of the user identifiers on the social networking application based on a context of the user's interaction with the social networking application without accessing the server. The context of the user's interaction with the social networking application includes at least one of text entered by the user in the social networking application, a time of the interaction, a location of the client device, and a trend in the user's past interactions. The prioritized list of user identifiers may be presented to the user in the social networking application operating on the client device when the text entered by the user in the social networking application includes the first metadata tag. The prioritized list of user identifiers may be condensed corresponding to characters entered by the user immediately following the first metadata tag. A user identifier may be selectable from the prioritized list of user identifiers by the user in the social networking application to auto-complete a string of characters.

According to various implementations, a computer program product comprising computer readable program code for creating scripts to provide offline prompts of online social network mentions is provided. The program code is to be executed by one or more processors when retrieved from a non-transitory machine-readable medium. The program code includes instructions to: receive, at a server, history data for a user of the social networking application; create, by the server, a script based on the history data for the at least one user, where the script, when executed by a client device remote from the server and operated by the user, provides a prioritized list of user identifiers on the social networking application; and send, by the server, the script to the client device.

In some implementations, a system for creating scripts to provide offline prompts of online social network mentions is provided that comprises one or more processors; and a non-transitory computer readable medium storing a plurality of instructions, which when executed, cause the one or more processors to: receive, at a server, history data for a user of the social networking application; create, by the server, a script based on the history data for the at least one user, where the script, when executed by a client device remote from the server and operated by the user, provides a prioritized list of user identifiers on the social networking application; and send, by the server, the script to the client device.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for creating scripts to provide offline prompts in a social networking application operating on a client device. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for a social network messaging system that may interact with or include an online social network, also referred to herein as a social networking system or an enterprise social network. Feed items in an information feed may include information updates stored in an on-demand database service environment. In some implementations, the disclosed methods, apparatus, systems, and computer program products may be configured or designed for use in a multi-tenant database environment.

Online social networks are increasingly becoming a common way to facilitate communication between individuals and groups of individuals, any of whom can be recognized as "users" with a corresponding "user identifier" in a social networking application. In many social networks, individuals may establish connections with one another. By establishing such a connection, one user may be able to see information generated by or associated with another user. For instance, a first user may be able to see information posted by a second user to a social networking page. One implementation of such a social networking page is a user's profile page, for example, in the form of a web page representing the user's profile. Another example implementation would be in the form of a message board to which multiple users may read from and post on. For example, the first user may be notified of a post by the second user on a feed viewable on the first user's account. Messages may also be directed to the second user's "wall" when the first user mentions or tags the second user in a post.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, images, audio data, video data, hyperlinks (including previews of the hyperlinked page(s)), or combinations of these. For instance, a post can include text in combination with a JPEG image or animated image.

In some implementations, the social networking application may allow users to broadcast messages to a wide audience, as well as to direct specific messages to a targeted individual or group of individuals. Mentions are commonly used within these messages during social networking communications. When a first user wishes to direct the attention of a second user or group of users to a specific post made by the first user, the first user may include a mention of the second user(s) by "tagging" the one or more additional users. A "mention" provides for an alert by the social networking application to a user of an account corresponding to a tagged user identifier. For example, a user may be tagged in a message on Twitter® by including a corresponding user identifier denoted by an "@" symbol in the message.

During the composition of these types of messages, an auto-complete application may automatically complete the typing of the intended user identifier or prompt a user to select from an auto-populated list of user identifiers that correspond to the already-entered characters. Referring back to the above Twitter® examples, when a user starts typing the characters of an example user identifier "steve" into a message, the auto-complete application will prompt the user (with each character entered) with a list of user identifiers that match the entered characters from which the user may select. That is, the user may be prompted with a first list corresponding to entry of "s", a list for the entry of "st", and so on.

As described above, most auto-complete applications submit requests from a client side user system to retrieve lists of user identifiers from the server, and do so for each character that the user inputs. Thus, if a user types the five characters for "steve," the auto-complete application executing on the client side user system makes five separate network requests to the server. In the absence of a network connection, these prompts may become unavailable. A client side user system, however, may be able to continue to provide prompts offline by running a script locally. As will be described in further details below, offline prompts may be provided in the same manner as the auto-complete prompts described above, even when the client side user system is not connected to the network. These offline prompts, which simulate the auto-complete prompts that are produced by sending the multiple network requests, can be generated by the script running on the client side user system.

In some implementations, an online social network may allow a user to follow data objects in the form of records such as cases, accounts, or opportunities, in addition to following individual users and groups of users. One example of such an online social network is Chatter®, provided by Salesforce.com® of San Francisco, Calif. Such online social networks can be implemented in various settings, including enterprises such as business organizations or groups within such an organization. For instance, Chatter® can be used by employee users of a business organization to communicate and collaborate with each other for various purposes.

The "following" of a record stored in a database, as described in greater detail below, allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein. A user that is mentioned in a record by being tagged may be automatically subscribed to follow the corresponding record stored in a database.

Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein. Additionally users may be mentioned in any of the ensuing update records, thereby directing the additional users to the record and/or subscribing them to subsequent updates.

Examples of record updates include field changes in the record, as well as the creation of the record itself. Examples of other types of information updates, which may or may not be linked with a particular record depending on the specific use of the information update, include messages as described herein. Examples of such messages include posts such as text or characters submitted by a user, multimedia data sent between or among users (for instance, included in a post), status updates such as updates to a user's status or updates to the status of a record, uploaded files, indications of a user's personal preferences such as "likes" and "dislikes," and links to other data or records. Records may further include metadata tags that denote specific actions, such an "@" symbol denoting a user identifier, and a "#" symbol denoting a topic or keyword.

Information updates can also be group-related, e.g., a change to group status information for a group of which the user is one of possibly additional members. A user following, e.g., subscribed to, a record is capable of viewing record updates on the user's news feed, which can also include the other various types of information updates described above. Any number of users can follow or be mentioned in a record, and thus view record updates in this fashion. Some records are publicly accessible, such that any user can follow the record, while other records are private, for which appropriate security clearance/permissions are a prerequisite to a user following the record.

Feed items in information feeds such as a user's news feed may include messages, which can take the form of: posts comprising textual/character-based inputs such as words (including metadata tags), phrases, statements, questions, emotional expressions, symbols, leetspeak, or combinations of these; responses to posts, also referred to herein as "comments", such as words, phrases, statements, answers, questions, reactionary emotional expressions, or combinations of these; indications of personal preferences which can be submitted as responses to posts or comments; status updates; hyperlinks that may be posted to a user account on the social networking application; and accompanying metadata tags that may provide an indication of a keyword/topic, and user. These posts or messages may further include uploads, such as presentations, documents, multimedia files, and the like In some implementations, a news feed may be specific to an individual user, a group of users, or a data object (e.g., a file, document, Web page, or a collection of documents, files, or Web pages). For instance, a group of users on a social network may publish a news feed. Members of the group and the larger social network may view and post to the group news feed in accordance with a permissions configuration for the news feed and the group.

In some implementations, when data such as posts or comments input from one or more users are published to an information feed for a particular user, group, object, or other construct within a social networking application, an e-mail notification or other type of notification (e.g., text message) may be transmitted to all users following the user, group, or object in addition to the posting of the published data as a feed item in one or more feeds, such as a news feed or a record feed. In some social networking applications, the occurrence of such a notification is limited to the first instance of a published input, which may form part of a larger conversation. For instance, a notification may be transmitted for an initial post, but neither for comments on the post nor for follow-up posts related to the initial post. In some other implementations, notifications are transmitted for all such published inputs. In some instances, such notifications may be sent to a user whose corresponding user identifier is tagged in a post.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The terms "client device," "user system", and "client side user system" are used interchangeably herein and generally refer to handheld computing devices, mobile phones, laptop computers, work stations, and/or any variety of computing devices that includes a network connection. The term client device may refer to a computing device that is operated by an end user at a location remote from a server to which the client device is communicatively coupled.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post published by a user. Feed items of information about a user can be presented in a user's profile feed of the database, while feed items of information about a record can be presented in a record feed in the database, by way of example. A profile feed and a record feed are examples of different information feeds. A second user following a first user or record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. In another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In one implementation, a "group feed" includes any feed item about any user in a group. In another implementation, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" is a feed of feed items about a particular user. In one implementation, the feed items for a profile feed are posts and comments that other users make about or send to the particular user, and status updates made by the particular user. Such a profile feed can be displayed on a page associated with the particular user. In another implementation, feed items in a profile feed could include posts made by the particular user and feed tracked updates initiated based on actions of the particular user.

Figure 1:
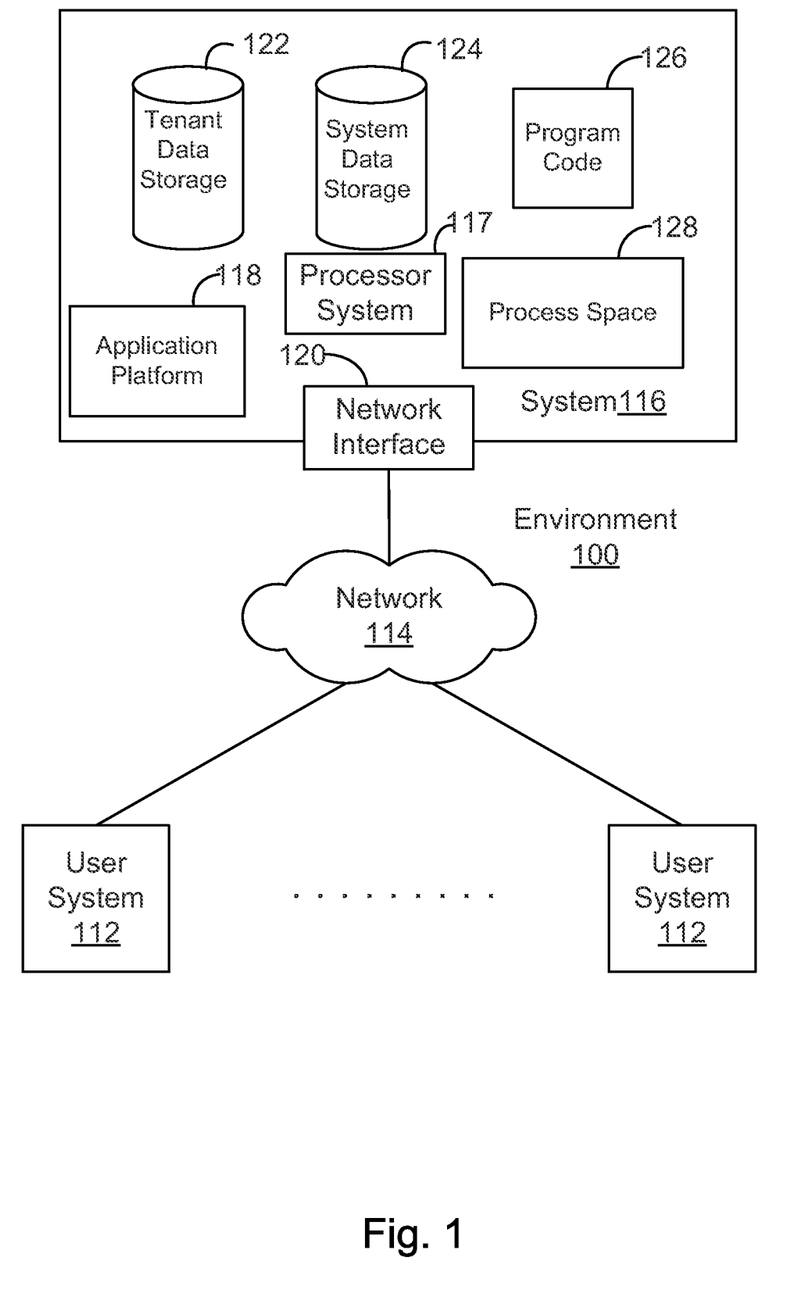
FIG. 1 shows a block diagram of an example of an environment in which an on-demand database service can be used in accordance with some implementations.

FIG. 1 shows a block diagram of an example of an environment 100 in which an on-demand database service can be used in accordance with some implementations. Environment 100 may include user systems 112, network 114, database system 116, processor system 117, application platform 118, network interface 120, tenant data storage 122, system data storage 124, program code 126, and process space 128. In other implementations, environment 100 may not have all of these components and/or may have other components instead of, or in addition to, those listed above.

Environment 100 is an environment in which an on-demand database service exists. User system 112 may be any machine or system that is used by a user to access a database system 116. For example, any of user systems 112 can be a handheld computing device, a mobile phone, a laptop computer, a work station, and/or a network of such computing devices. As illustrated in FIG. 1 user systems 112 might interact via a network 114 with an on-demand database service, which is implemented in the example of FIG. 1 as database system 116.

An on-demand database service, such as system 116, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 118 may be a framework that allows the applications of system 116 to run, such as the hardware and/or software, e.g., the operating system. In some implementations, application platform 118 enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a user is using a particular user system 112 to interact with system 116, that user system has the capacities allotted to that user. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. Network 114 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP signals to and from an HTTP server at system 116. Such an HTTP server might be implemented as the sole network interface 120 between system 116 and network 114, but other techniques might be used as well or instead. In some implementations, the network interface 120 between system 116 and network 114 includes load sharing functionality, such as round-robin HTTP request distributors to balance loads and distribute incoming HTTP requests evenly over a plurality of servers. At least for users accessing system 116, each of the plurality of servers has access to the MTS' data; however, other alternative configurations may be used instead.

In one implementation, system 116, shown in FIG. 1, implements a social networking application system. For example, in one implementation, system 116 includes application servers configured to implement and execute social networking software applications as well as provide related data, code, forms, web pages and other information to and from user systems 112 and to store to, and retrieve from, a database system related data, objects, and Webpage content. With a multi-tenant system, data for multiple tenants may be stored in the same physical database object in tenant data storage 122, however, tenant data typically is arranged in the storage medium(s) of tenant data storage 122 so that data of one tenant is kept logically separate from that of other tenants so that one tenant does not have access to another tenant's data, unless such data is expressly shared. In certain implementations, system 116 implements applications other than, or in addition to, a social networking application. For example, system 116 may provide tenant access to multiple hosted (standard and custom) applications, including a social networking application. User (or third party developer) applications, which may or may not include social networking applications, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 223, system data storage 124 for system data accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 112 and all of its components are operator configurable using applications, such as a browser, including computer code run using a central processing unit such as an Intel Pentium® processor or the like. Similarly, system 116 (and additional instances of an MTS, where more than one is present) and all of its components might be operator configurable using application(s) including computer code to run using processor system 117, which may be implemented to include a central processing unit, which may include an Intel Pentium® processor or the like, and/or multiple processor units.

A computer program product implementation includes a non-transitory machine-readable storage medium (media) having instructions stored thereon/in, which can be used to program a computer to perform any of the processes/methods of the implementations described herein. Computer program code 126 for operating and configuring system 116 to intercommunicate and to process web pages, applications and other data and media content as described herein is preferably downloadable and stored on a hard disk. The entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein.

Similarly, the database objects described herein can be implemented as single databases, a distributed database, a collection of distributed databases, a database with redundant online or offline backups or other redundancies, etc., and might include a distributed database or storage network and associated processing intelligence.

Figure 2:
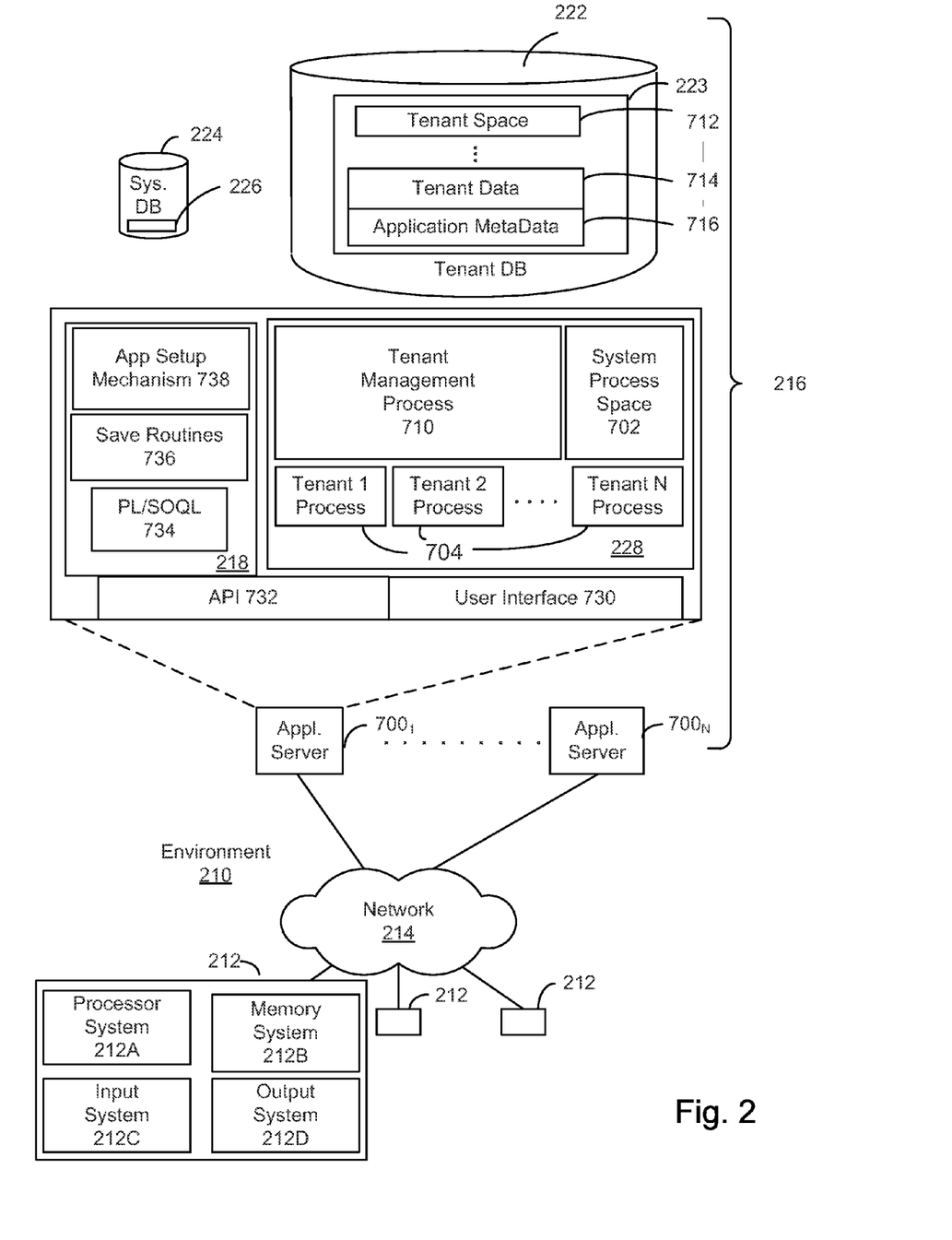
FIG. 2 illustrates a block diagram of an embodiment of elements of FIG. 1 and various possible interconnections between these elements.

FIG. 2 illustrates environment 210. However, in FIG. 2 elements of system 216 and various interconnections in an embodiment are further illustrated. FIG. 2 shows that user system 212 may include processor system 212A, memory system 212B, input system 212C, and output system 212D. FIG. 2 shows network 214 and system 216. FIG. 2 also shows that system 216 may include tenant data storage 222, tenant data 223, system data storage 224, system data 226, User Interface (UI) 730, Application Program Interface (API) 732, PL/SOQL 734, save routines 736, application setup mechanism 738, applications servers $700_1$-$700_N$, system process space 702, tenant process spaces 704, tenant management process 710, tenant storage area 712, user storage 714, and application metadata 716. In other embodiments, environment 210 may not have the same elements as those listed above and/or may have other elements instead of, or in addition to, those listed above.

User system 112, network 114, system 116, tenant data storage 122, and system data storage 124 were discussed above in FIG. 1. Regarding user system 212, processor system 212A may be any combination of one or more processors. Memory system 212B may be any combination of one or more memory devices, short term, and/or long term memory. Input system 212C may be any combination of input devices, such as one or more keyboards, mice, trackballs, scanners, cameras, touch screens, and/or interfaces to networks. Output system 212D may be any combination of output devices, such as one or more monitors, printers, and/or interfaces to networks.

As shown by FIG. 2, system 216 may include a network interface 120 (of FIG. 1) implemented as a set of HTTP application servers 700, an application platform 218, process space 228 for executing MTS system processes and tenant-specific processes, tenant data storage 222, and system data storage 224. Also shown is system process space 702, including individual tenant process spaces 704 and a tenant management process space 710. Each application server 700 may be configured to tenant data storage 222 and the tenant data 223 therein, and system data storage 224 and the system data 226 therein to serve requests of user systems 212. The tenant data 223 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 216 resident processes to users and/or developers at user systems 212. The tenant data and the system data may be stored in various databases, such as one or more Oracle® databases.

Application platform 218 includes an application setup mechanism 738 that supports application developers' creation and management of applications, which may be saved as metadata into tenant data storage 222 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 226 and tenant data 223, via a different network connection. For example, one application server $700_1$ might be coupled via the network 214 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 212 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 216 is multi-tenant, wherein system 216 handles storage of, and access to, different objects, data and applications across disparate users and organizations.

As an example of storage, one tenant might be a social networking company that provides an application where users can engage the application via system 216 to manage a profile and different forms of communications. Thus, a user might maintain contact data, messages, information feeds, and digital media (such as pictures, videos, hyperlinks, etc.) corresponding to that user's profile (e.g., in tenant data storage 222). In an example of a MTS arrangement, since all of the data and the applications to access, view, modify, transmit, receive, etc., can be maintained and accessed by a user system having nothing more than network access, the user can manage his or her profiles and communications from any of many different user systems. For example, if a user is accessing the application using a mobile device that has Internet access, the user can obtain the same information updates as that user can obtain using any other type of devices, whether public or private, as long as the user logs into his or her own account.

While each user's data might be separate from other users' data regardless of the networks of each user, some data might be organization-wide data shared or accessible by a plurality of users or all of the users for a given organization that is a tenant. Thus, there might be some data structures managed by system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 216 might also maintain system level data usable by multiple tenants or other data. Such system level data might include industry reports, news, postings, and the like that are sharable among tenants.

In certain embodiments, user systems 212 (which may be client systems) communicate with application servers 700 to request and update system-level and tenant-level data from system 216 that may require sending one or more queries to tenant data storage 222 and/or system data storage 224. System 216 (e.g., an application server 700 in system 216) automatically generates one or more SQL statements (e.g., one or more SQL queries) that are designed to access the desired information. System data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a social networking application database may include a table that describes a user with fields for basic contact information such as name, location, email, etc. Another table might describe organizations with which the user is affiliated, including fields for information such as home town, school(s) attended, work, affinity groups, etc. In some multi-tenant database systems, standard entity tables might be provided for use by all tenants. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Figure 3:
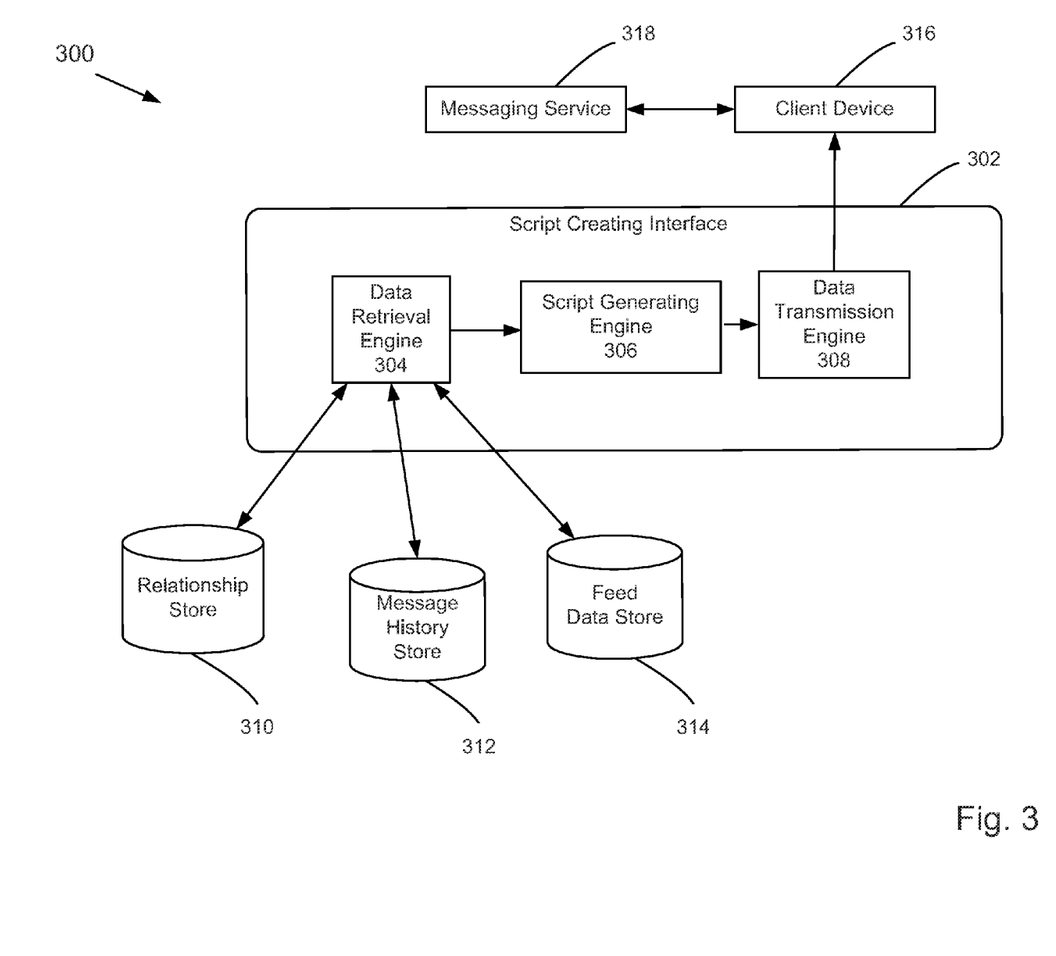
FIG. 3 illustrates an example of a server system for creating scripts to provide offline prompts in a social networking application operating on a client device.

FIG. 3 shows a block diagram of an example of a system in which scripts to provide offline prompts in a social networking application are created. System 300 provides an interface that processes history data from a user engaged in a social networking or collaborative environments in order to create a script to provide offline prompts. History data may be aggregated from many different database systems that are used to provide different services and support different user accounts. System 300 may include script creating interface 302, data retrieval engine 304, script generating engine 306, data transmission engine 308, relationship store 310, message history store 312, and feed data store 314. System 300 may be connected to client device 316 that communicates with messaging service 318.

Script creating interface 302 may be an application program that processes message and feed history information, and produces a script for one or more collaborative environments or social networks, and various different modes of communication, such as messaging service 318. Collaborative networks and social networks may refer to online social networks such as Facebook®, Twitter®, and Chatter®. Modes of communication may include an instant messaging service, such as Chatter® Instant Messenger, or any other synchronous or asynchronous messaging system. Thus, script creating interface 302 may include one or more components that manage the storing, retrieval, and sharing of message data among various different components of system 300. Script creating interface 302 may be a software application implemented in one or more servers that include hardware and software configured to execute instructions from a non-transitory computer readable medium. Script creating interface 302 may also be a specific instance of a software application that has been instantiated for a user's account as part of an on-demand service that the user subscribes to. Alternatively, script creating interface 302 may be a shared resource that multiple users may access.

Script creating interface 302 may include data retrieval engine 304. Data retrieval engine 304 may be communicatively coupled to data stores to retrieve information from and send information to the one or more data stores for messaging service 318. Data retrieval engine 304 may retrieve a history of messages sent by one or more users stored on message history store 312 or other storage devices. Data retrieval engine 304 may also retrieve a contact list of the user from relationship store 310. The contact list may include users that are within a first degree of separation of the user. In some instances, it may be beneficial to retrieve a contact list of users within multiple degrees of separation from the user. In addition to history information and contact lists, data retrieval engine 304 may further retrieve message feeds from one or more users from feed data store 314. Message feeds may be populated with words, phrases, statements, answers, questions, reactionary emotional expressions, or any combinations of these; indications of personal preferences which can be submitted as responses to posts or comments; status updates; hyperlinks that may be posted to a user account on the social networking application; and accompanying metadata tags that may provide an indication of a keyword/topic, and user. These posts or messages may further include uploads, such as presentations, documents, multimedia files, and the like Script creating interface 302 may also include script generating engine 306, which processes the data retrieved by data retrieval engine 304 to generate script to provide offline prompts in the social networking application. As described above, most auto-complete applications submit requests to retrieve lists of user identifiers from the server. In the absence of a network connection, these prompts may become unavailable. By running a script generated by script generating engine 306, a client side user system may be able to continue to provide these prompts offline. The generated script, when executed on a client device, may cause the social networking application to prompt the user with an auto-complete list of user identifier based on the context of the message being composed by the user and the data retrieved by data retrieval engine 304. For example, when the script is executed, the script may identify keywords and metadata tags that indicate a topic and/or user identifiers from the composition of the message. The script may further utilize information retrieved from the data stores in order to produce the auto-complete list. Thus, the auto-complete list provides an "intelligent" list from which the user may select to auto-complete a user identifier for tagging another user in a message or post. That is, the auto-complete list is a prediction, based on the context of the message being composed and a history of the messages and posts by the user, of which user identifier the user is likely to tag in the message being composed.

Script creating interface 302 may further include data transmission engine 308, which is provided for transmitting the generated script to client device 316 for execution. For example, data transmission engine 308 may be communicatively coupled to client device 316 (e.g., a personal computer, workstation, PDA, cell phone, or any other computing device capable of interfacing directly or indirectly to the Internet or other network connection). A social networking application, for which the script is generated, may be run on client device 316. Once the generated script has been transmitted to client device 316, the client device may execute the script in the context of the social networking application. Upon executing the script in the context of the social networking application, a user may be prompted by the application with an auto-complete list of user identifier. Since the script is generated based on the history of messages retrieved by data retrieval engine 304, the auto-complete list will also be related to the history of messages retrieved. For example, if a first user commonly tags a second user in messages or posts on the social networking application, that second user may be considered as having a high probability of being tagged in subsequent posts. Additionally, certain users and certain topics and/or keywords may be linked. Thus, if a message is determined to be composed in the context of work, and is, for example, determined to be seeking the approval of a superior, the script may determine from the relationships identified from the contact list that a coworker, or more specifically, a superior of the user should be tagged in the post.

Once the generated script is transmitted from the script creating interface 302 to the client device 316, the script may be run on client device 316 whether a network connection is available or not. In other words, if the user is composing a message on a mobile device and happens to move out of range for cellular and WiFi service, the auto-complete list of user identifiers may still be prompted since the list is generated locally by the script when the mobile device goes offline, as opposed to be being generated by an algorithm running on the server and passed to client device 316 via a network connection when the mobile device is connected to a network. In some embodiments, the scripts may be synced when user device 316 is online. This syncing process may occur based on a set schedule, or it may occur when a new script is generated to replace an older one. New scripts may be created periodically in order to remain current with the trends and behavior of the user.

Figure 4:
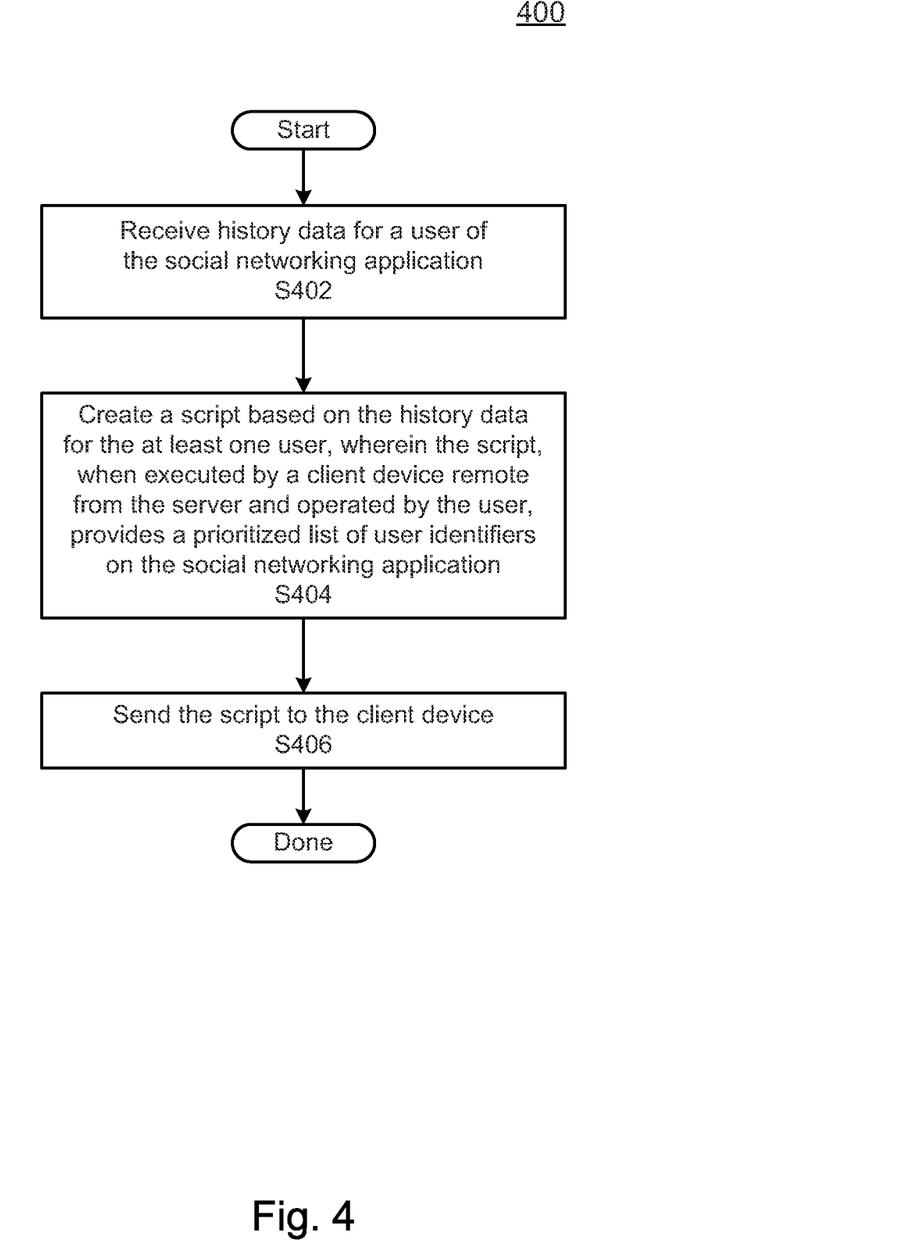
FIG. 4 illustrates example flowchart for creating scripts to provide offline prompts in a social networking application operating on a client device.

FIG. 4 illustrates example method 400 for creating scripts to provide offline prompts in a social networking application operating on a client device. History data for a user of the social networking application is obtained at a server, according to S402. Upon receiving history data, a script is created by the server, according to S404. The script is created based on the history data for the at least one user. The script, when executed by a client device remote from the server and operated by the user, provides a prioritized list of user identifiers on the social networking application. Once the script has been generated, the script is sent to the client device by the server, according to S406. The script, as discussed above in reference to FIG. 3, may be executed on the client device, with or without an adequate network connection, since the script does not rely on a connection to the server to be executed.

In certain embodiments, the generated script causes the social networking application to create a prioritized list of user identifiers. For example, the script, when executing on the client device, prepares a prioritized, sorted list of usernames that are statistically probable to be mentioned in further posts based on a specific user's history. The script may be generated to draw conclusions such as "when User A is mentioned, User B is very likely to be mentioned too," such that User B should be offered to the user as an auto-complete option. This algorithm may take into account many factors, such as public or private groups, time of day, and other keywords (e.g. "escalation" often causes "VP Joe" to be mentioned).

The server creates the script for generating prioritized lists of the user identifiers for prompting a user of the application on the client device. After the script has been generated on the server-side, the server sends the script packaged into a downloadable format and to be executed or interpreted on the client side user system when the client side user system is disconnected from a network.

In some implementations, the history data for a user is obtained based on a user identifier. For example, a user of a social networking application may have a corresponding user identifier which the user may use to log into an account on the application. For each user account, history data may be collected and stored on a data store. History data may include messages sent or comments posted to or from the user account on the social networking application. For example, a first user may post on a feed of a second user's account, or a first user may post to a communication thread that a second user may be subscribed to or read from. These posts or messages may include words, phrases, statements, answers, questions, reactionary emotional expressions, or any combinations of these; indications of personal preferences which can be submitted as responses to posts or comments; status updates; hyperlinks that may be posted to a user account on the social networking application; and accompanying metadata tags that may provide an indication of a keyword/topic, and user. These posts or messages may further include uploads, such as presentations, documents, multimedia files, and the like.

In some embodiments, the account history may be processed in generating scripts to provide offline prompts in the social networking application. Keywords/phrases or user identifiers may be identified for each message or post in the history of messages that is retrieved. In some instances, keywords may be linked with a user identifier (indicated by a metadata tag such as an "@" symbol). For example, if multiple instances of the keyword/phrase "baseball" were mentioned in posts that also included the user identifier "@tom", then an inference may be made that @tom and the user are connected via baseball (e.g., they may be on the same baseball team or like the same professional baseball team). The higher the frequency of such an occurrence, the more confident the inference of a connection exists between the two users on the topic of baseball.

In some embodiments, the generated script may cause the client device to filter the auto-complete list of user identifiers based on a contact list associated with the user and the characters being input by the user into the social networking application. That is, when a user enters a text to be posted on a feed or sent as a message, the user may be prompted with the auto-complete list. The auto-complete list may provide a list of users that correspond to the character(s) entered by the user. If the user inputs the letter "s", the auto-complete list may prompt the user with a number of user identifiers that start with the letter "s" from which to choose. With each additional character entered, the auto-complete list may be further filtered to remove the user identifiers that no longer match the characters entered. For example, a user intending to enter the user identifier "steve" will start by entering the letter "s" followed by the subsequent letters "t", "e", "v", and "e". When the user enters the first letter "s", the list may be narrowed down to all user identifiers starting with the letter "s". When the user enters the second letter "t", the list may be narrowed down to all user identifiers starting with the letters "st", and so on.

In some embodiments, there may be a limit to the number of auto-complete suggested user identifiers in the list which the application displays to the user. As such, the list may not be able to display all the auto-complete candidates. While some auto-complete applications simply display entries based on alphabetical order, a shortened list that displays the most likely auto-complete candidates may be preferred. Thus, in some instances, the auto-complete list of suggested user identifiers may be sorted based on the historical data. For example, if a first user mentions a second user regularly in messages or posts, the second user may be prioritized to the top of an auto-complete list. In some instances, the prioritization may be based on a time and/or location stamp, such that a most recently mentioned user identifier, or a user identifier that indicates a location closest to the user composing the message, may have priority in being suggested in the auto-complete list.

Additionally, topics and trends may used to determine the prioritization of the list. As discussed above, a topic may be identified as "baseball" based on the text of a message or a post, and there may be multiple user identifiers that are mentioned in messages or posts identified as having the topic of baseball. Thus, when a new message or post includes the topic or the word baseball, the script may determine from the text that is entered that certain user identifiers corresponding to previously mentioned users should be prioritized in the auto-complete list. In some examples, topics or keywords and a user identifier may be indicated by metadata tags, such as "#" and "@", respectively, as used in certain social networking applications. When a string of text follows the symbol "#", it may be noted that the string of text provides an indication of a subject or topic that the user is associated with the message or post. Similarly, when a string of text follows the symbol "@", it may be noted that the string of text provides an indication of a user identifier. And if one or more user identifiers appear on messages with a particular topic with a certain amount of regularity, an association between the one or more user identifiers and the topic may be inferred.

In some embodiments, metadata that is not part of the message may be used to identify topics, keywords, and/or users identifiers. For example, a user may tag a post or message with certain words or identifiers upon entry of the message. These tags may not be presented in the message or post, but are appended to the message as metadata in one form or another. In other embodiments, metadata tags may be completely absent from a message composition. In these instances, keywords that correlate to topics or user identifiers may be determined by identifying parts of speech (e.g., nouns, verbs, adjectives, etc.) in a message. Once the parts of speech have been identified, a determination of the construct of the message may be made, and certain important keywords may be selected based on the construct. These keywords, whether tagged as metadata or determined from the context of the message, may be used under the same concept as those describe above relating to the use of metadata tags.

In other embodiments, the script may be generated to take into consideration the relationship between different users. Such relationships may be extracted from contact list data of a user's social networking account, where the user may identify certain contacts as family members, friends, colleagues, etc. When a social networking application is used in the context of work, certain keywords like approval, review, edit, etc., may be common. Different keywords may prompt the suggestion of different user identifiers in the auto-complete list. For example, if a user types in the word "approval", the application may prioritize the user's manager(s) or superior(s) in the auto-complete list. In a social context, keywords such as "Thanksgiving" or "holiday" may cause the auto-complete list to prioritize user identifiers corresponding to family members.

Figure 5:
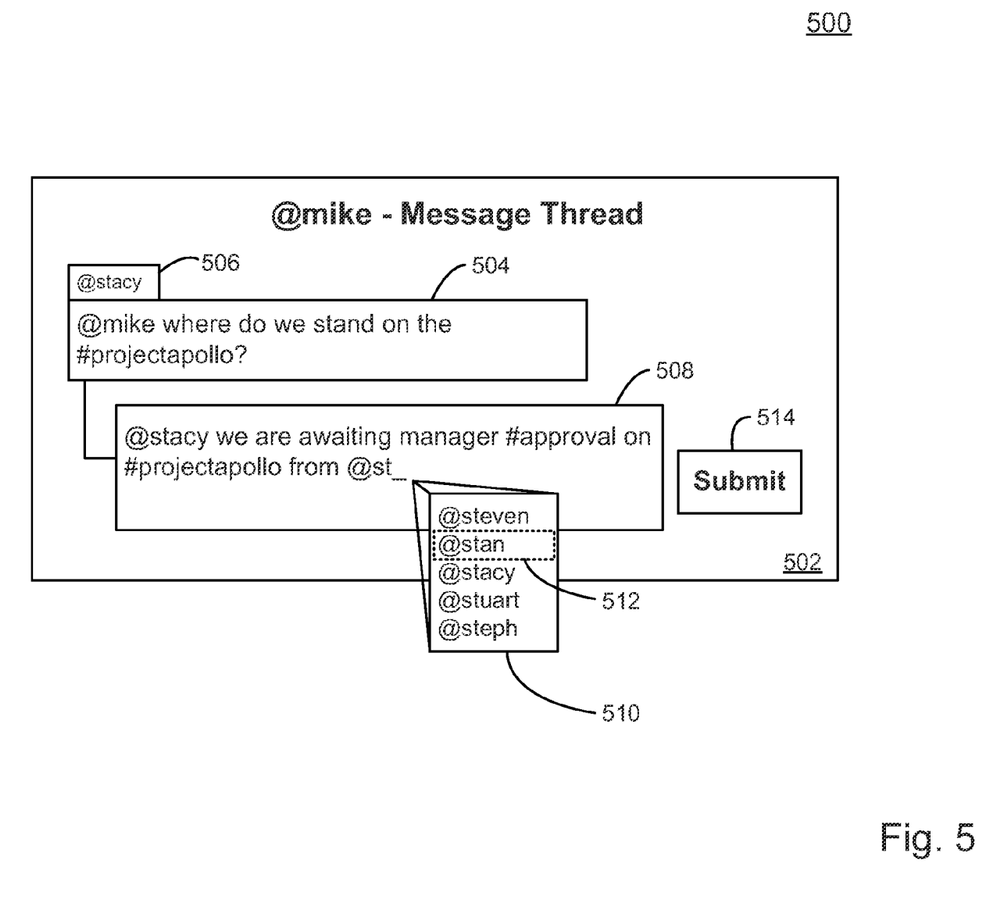
FIG. 5 illustrates an example user interface screen in accordance with some implementations.

FIG. 5 illustrates an example user interface screen that may be rendered, in accordance with some implementations. User interface screen 500 may provide a customer or user with a presentation of a communication tool, such as a messaging service. User interface screen 500 may include a message thread field 502 that displays a message history for a current conversation thread. The conversation thread may be between any groups of users, including colleagues at a company as shown in this example. For example, multiple members of a team may be communicating with one another regarding a project on which the team members are staffed. Here, message 504 was received from user @stacy, as indicated by author box 506. Message 504 is displayed on message thread field 502 of user @mike. The message thread field 502 includes an message box 508 from which user @mike may respond to the thread.

As discussed above in reference to FIG. 4, topics or keywords may be indicated by metadata tags, such as "#". In this example, the terms "approval" and "projectapollo" may be determined to be keywords as it follows metadata tag #. As such, the generated script described in reference to FIGS. 3 and 4 above may utilize these keywords to prioritize the auto-complete options of the user identifier list. Additionally, the history of the message thread may further be used in generating script, as described above in reference to FIGS. 3 and 4. Since message history includes message 504 as being posted by user @stacy, the script may be generated to prioritize @stacy in the auto-complete list, especially in reference to keyword "projectapollo." The client device on which the generated script is run creates auto-complete user identifier list 510 based on the information described above. That is, the auto-complete list in this example is determined based on the message posted by @stacy, the keywords "approval" and "projectapollo", and user account (i.e., @mike) viewing the message thread. The auto-complete list may further be determined based on time stamp, location, the relationship between users @stacy and @mike, as well as a variety of other metrics of the message thread.

As shown in the figure, user @mike has started to enter text in message box 508 to post a message on message thread 502. In the message box, user @mike has mentioned user @stacy and also the keywords "approval" and "projectapollo". Based on the user identifier and keywords, as well as the entered text "st" following the @ metadata tag in message box 508, the social networking application running the generated script will prompt user @mike with a corresponding list of auto-complete candidates in a list. In this example, @stacy may be provided as an option. However, the keyword "approval" may prioritize managers, @steven and @stan, of the organization over colleague @stacy. Specifically, @steven and @stan may be managers on "projectapollo"; thus, their priority over @stacy. User identifiers @stuart and @steph may be lower in priority than @stacy by virtue of their being colleagues that are determined to not be on previous messages in the thread, or not associated with projectapollo.

Once user identifier list 510 is presented to user @mike, a selection may be made to complete the user identifier entry. In this example, user mike has selected @stan as shown by selection 512. Once selected, @stan will auto-complete for the @st that has been entered into message box 508. Upon clicking submit button 514, the message will be posted to message thread 502. After the message has been posted, the message and the associated metadata become part of the history of the message thread, which may later be used to update/generate script to be sent to client devices for the purpose of providing offline prompts in a social networking application.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for creating scripts to provide offline prompts in a social networking application operating on a client device, the method comprising:
   receiving, at a server, history data for a user of the social networking application;
   creating, by the server, a script based on the history data for the at least one user, wherein the script, when executed by a client device remote from the server and operated by the user, provides a prioritized list of user identifiers on the social networking application; and
   sending, by the server, the script to the client device.

2. The method of claim 1, wherein the history data for the user of the social networking application includes at least one of previous mentions of users and previous mentions of topics in posts of the social networking application.

3. The method of claim 2, wherein the previous mentions of users are indicated by user identifiers corresponding to the mentioned users, the user identifiers identified as characters immediately following a first metadata tag, and wherein the previous mentions of topics are indicated by characters immediately following a second metadata tag.

4. The method of claim 3, wherein the first metadata tag is an "@" symbol, and the second metadata tag is a "#" symbol.

5. The method of claim 3, wherein the created script, when executed, provides the prioritized list of the user identifiers on the social networking application based on a context of the user's interaction with the social networking application without accessing the server.

6. The method of claim 5, wherein the context of the user's interaction with the social networking application includes at least one of text entered by the user in the social networking application, a time of the interaction, a location of the client device, and a trend in the user's past interactions.

7. The method of claim 6, wherein the prioritized list of user identifiers is presented to the user in the social networking application operating on the client device when the text entered by the user in the social networking application includes the first metadata tag, the prioritized list of user identifiers being condensed corresponding to characters entered by the user immediately following the first metadata tag.

8. The method of claim 7, wherein a user identifier is selectable from the prioritized list of user identifiers by the user in the social networking application to auto-complete a string of characters.

9. The method of claim 2, wherein the previous mentions of topics is determined based on keywords extracted from the text in the posts.

10. A computer program product comprising computer readable program code for creating scripts to provide offline prompts of online social network mentions, the program code to be executed by one or more processors when retrieved from a non-transitory machine-readable medium, the program code including instructions to:
   receive, at a server, history data for a user of the social networking application;
   create, by the server, a script based on the history data for the at least one user, wherein the script, when executed by a client device remote from the server and operated by the user, provides a prioritized list of user identifiers on the social networking application; and
   send, by the server, the script to the client device.

11. The computer program product of claim 10, wherein the history data for the user of the social networking application includes at least one of previous mentions of users and previous mentions of topics in posts of the social networking application; the previous mentions of users are indicated by user identifiers corresponding to the mentioned users, the user identifiers identified as characters immediately following a first metadata tag; and the previous mentions of topics are indicated by characters immediately following a second metadata tag.

12. The computer program product of claim 11, wherein the first metadata tag is an "@" symbol, and the second metadata tag is a "#" symbol.

13. The computer program product of claim 11, wherein the created script, when executed, provides the prioritized list of the user identifiers on the social networking application based on a context of the user's interaction with the social networking application without accessing the server.

14. The computer program product of claim 13, wherein the context of the user's interaction with the social networking application includes at least one of text entered by the user in the social networking application, a time of the interaction, a location of the client device, and a trend in the user's past interactions.

15. The computer program product of claim 14, wherein the prioritized list of user identifiers is presented to the user in the social networking application operating on the client device when the text entered by the user in the social networking application includes the first metadata tag, the prioritized list of user identifiers being condensed corresponding to characters entered by the user immediately following the first metadata tag, and wherein a user identifier is selectable from the prioritized list of user identifiers by the user in the social networking application to auto-complete a string of characters.

16. The computer program product of claim 11, wherein the previous mentions of topics is determined based on keywords extracted from the text in the posts.

17. A system for creating scripts to provide offline prompts of online social network mentions, the system comprising:
   one or more processors; and
   a non-transitory computer readable medium storing a plurality of instructions, which when executed, cause the one or more processors to:
      receive, at a server, history data for a user of the social networking application;
      create, by the server, a script based on the history data for the at least one user, wherein the script, when executed by a client device remote from the server and operated by the user, provides a prioritized list of user identifiers on the social networking application; and
      send, by the server, the script to the client device.

18. The system of claim 17, wherein the history data for the user of the social networking application includes at least one of previous mentions of users and previous mentions of topics in posts of the social networking application.

19. The system of claim 18, wherein the previous mentions of topics is determined based on keywords extracted from the text in the posts.

20. The system of claim 18, wherein the created script, when executed, provides the prioritized list of the user identifiers on the social networking application based on a context of the user's interaction with the social networking application without accessing the server.

* * * * *